US012523637B2

(12) United States Patent
Rowe

(10) Patent No.: US 12,523,637 B2
(45) Date of Patent: Jan. 13, 2026

(54) AUTOMATED DILUTER FOR CALIBRATION OF A GAS CHROMATOGRAPH IN OILFIELD APPLICATIONS

(71) Applicant: Halliburton Energy Services, Inc., Houston, TX (US)

(72) Inventor: Mathew Dennis Rowe, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 267 days.

(21) Appl. No.: 18/373,759

(22) Filed: Sep. 27, 2023

(65) Prior Publication Data

US 2025/0102478 A1    Mar. 27, 2025

(51) Int. Cl.
  *G01N 30/34*   (2006.01)
  *E21B 49/00*   (2006.01)
  *G01N 30/86*   (2006.01)
  *G01N 30/02*   (2006.01)

(52) U.S. Cl.
  CPC ........... *G01N 30/34* (2013.01); *E21B 49/005* (2013.01); *G01N 30/8665* (2013.01); *G01N 2030/025* (2013.01)

(58) Field of Classification Search
  CPC .................................................. G01N 30/8665
  See application file for complete search history.

(56) References Cited

U.S. PATENT DOCUMENTS

| 10,001,465 B2 | 6/2018 | Mitchell |
| 10,641,757 B2 | 5/2020 | Rowe |
| 2016/0084807 A1 | 3/2016 | Srinivasan et al. |
| 2017/0153211 A1 | 6/2017 | Bright |

(Continued)

FOREIGN PATENT DOCUMENTS

| JP | 2014119318 A | 6/2014 | |
| WO | WO-2019106833 A1 * | 6/2019 | ............. G01N 30/06 |

OTHER PUBLICATIONS

International Search Report and Written Opinion for International Patent Application No. PCT/US2023/077306 dated Jun. 18, 2024. PDF file. 8 pages.

(Continued)

*Primary Examiner* — John E Breene
*Assistant Examiner* — Alex T Devito
(74) *Attorney, Agent, or Firm* — Benjamin Ford; C. Tumey Law Group PLLC

(57) ABSTRACT

A variety of methods and systems are disclosed, including, in one example, a method that includes extracting one or more dissolved gases from one or more fluid samples to form one or more extracted gases. The method also includes configuring a dilution rate with an information handling system, automatically diluting the one or more extracted gases with diluent at the dilution rate to form one or more diluted extracted gases and adding the one or more diluted extracted gases to a carrier gas to form sample gas. The method also includes separating one or more components of the sample gas with one or more gas chromatographs, measuring one or more analytes of the sample gas with one or more detectors, and calibrating the one or more gas chromatographs based at least in part on the measuring of the one or more analytes.

20 Claims, 8 Drawing Sheets

(56) References Cited

U.S. PATENT DOCUMENTS

| | | |
|---|---|---|
| 2018/0088096 A1 | 3/2018 | Ritzmann et al. |
| 2018/0156034 A1 | 6/2018 | Mitchell et al. |
| 2018/0245466 A1 | 8/2018 | Gosney et al. |
| 2019/0368345 A1 | 12/2019 | Rowe et al. |
| 2020/0256188 A1 | 8/2020 | Rowe |
| 2021/0389239 A1 | 12/2021 | Rowe |
| 2021/0404273 A1 | 12/2021 | Rowe |
| 2022/0065105 A1 | 3/2022 | Rowe |

OTHER PUBLICATIONS

ResearchGate, Development of a liquid chromatography Ion trap mass spectrometer method for clinical drugs of abuse testing with automated on-line extraction using turbulent flow chromatography, Sep. 2014.

\* cited by examiner

AUTOMATED DILUTER FOR CALIBRATION OF A GAS CHROMATOGRAPH IN OILFIELD APPLICATIONS

BACKGROUND

During wellbore operations, such as when drilling through a subterranean formation, formation fluids and gases may become entrapped in drilling fluid. These gases are extracted at the surface and analyzed using gas chromatography, mass spectrometry, or other analytical techniques, and equation of state calculations using this analysis data are then used to estimate the composition of the formation fluids. This information is often used to characterize the depositional environment and optimize drilling. For example, fluid analysis may allow an operator to identify and quantify fluids such as oil, gas, water, and other formation fluids at various depths within the subterranean formation.

In the context of gas chromatography, calibration curves are graphical representations showing the relationship between concentration of an analyte in a sample and a corresponding response signal generated by a detector of a gas chromatograph. As a general rule, the x-axis of a calibration curve is the known concentration of the analyte, and the y-axis is the response signal. Calibration curves are useful in that, since they establish relationships between concentration and response signal, they are used as a reference to estimate the concentrations of the analyte in unknown samples.

Current methods of calibrating gas chromatographs do not adequately capture the full curvature of these calibration curves, especially when only sparse amounts of data are used. This is particularly problematic when a high number of analytes are present in a sample, where a high number of individual calibration curves may be required. Generating calibration curves is time-consuming and thus only sparse amounts of data are collected. In addition, calibration of these analysis tools often produces calibration curves with limited ranges, for example, across only a single decade of concentration.

BRIEF DESCRIPTION OF THE DRAWINGS

These drawings illustrate certain aspects of the examples of the present invention and should not be used to limit or define the invention.

DETAILED DESCRIPTION

Figure 1:
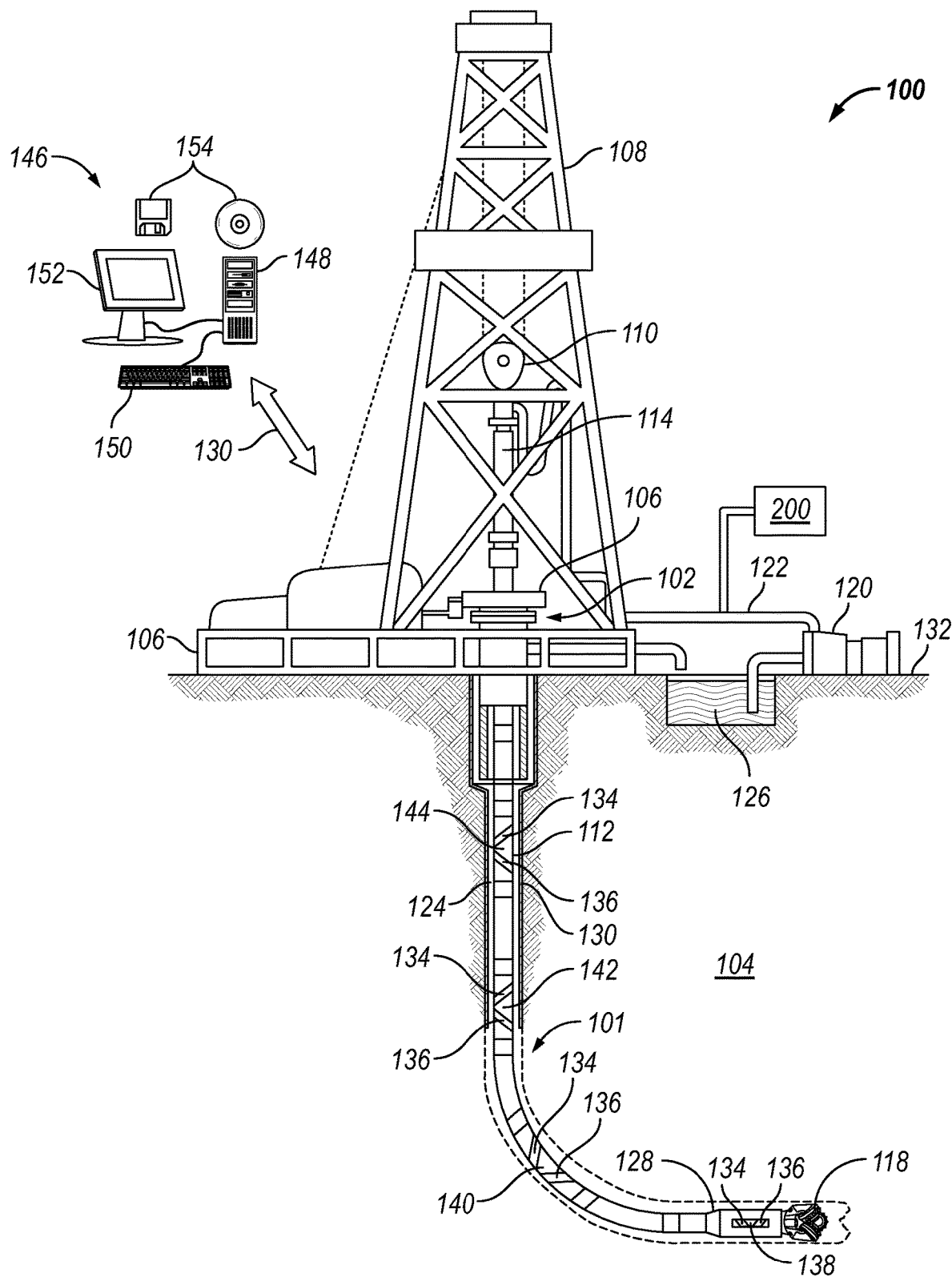
FIG. 1 illustrates a drilling system, in accordance with one or more examples of the present disclosure.

Disclosed herein are methods and systems for performing calibration of one or more gas chromatographs. Also disclosed herein are methods and systems for using one or more calibrated gas chromatographs during a drilling operation.

The methods and systems described herein may be performed in conjunction with equipment at a rig site. Equipment used at a rig site may include, to use non-limiting examples, any equipment which would commonly be used during drilling, well stimulation, and/or production of a hydrocarbon-bearing reservoir.

The methods and systems disclosed herein may address, without limitation, the problems previously stated by this disclosure. Specifically, an automated dilution system is incorporated into these methods and systems, to be discussed in detail. As used herein, "automated diluter" refers to the various automated dilution systems described throughout the disclosure.

As previously alluded to, curvilinearity of calibration curves are frequently under-represented by gas chromatographs especially when measurement data is sparce, or rather due to the sparsity of the measurement data. In scenarios where a large number of (e.g., 5 or more) separate components are present in a sample gas (e.g., calibration sample), the relationships between the components are not adequately understood or represented. This essentially poses a multivariable calculus problem, with the plural, complex interactions between components influencing the curvilinearity of the calibration. Conventional solutions generally involve a large number of separate calibrations; however, these solutions require an inordinate amount of testing, samples, and individual tests, which are all time consuming and also difficult to perform effectively on-the-fly. Since the exact composition of a wellbore test fluid often varies from geographic location to geographic location, it is necessary to understand these plural, complex interactions quickly and reliable to avoid the amount of nonproductive downtime at the work site. In addition, modulating between concentration ranges even for a single calibration set is also a time-consuming and inefficient process which would require diligent attention by a human operator, who is also prone to error. The present disclosure aims to address these and other issues by providing a methodology which relies on automated dilution with an information handling system to gauge quickly and accurately these multivariable and complex interactions between components. Further, matching the speed of a calibration to the cycle time of the instrument (s) involved also eliminates nonproductive downtime, as modulation between the different concentration ranges is performed automatically by an information handling system, which in some examples requires little or no human intervention.

Automatic dilution of the various sample gases, gas mixtures, and test fluids of the present disclosure is performed by diluting the concentration(s) of one or more analytes of a sample gas with an information handling system. It should be understood that each and every principle taught herein with respect to dilution (i.e., decreasing concentration of an analyte) may be equally applied in the reverse (i.e., by increasing concentration). For example, the terms "dilution rate" and "diluent source", as used herein, may be substituted with "concentration rate" and "concentrate source" without departing from the scope and spirit of the disclosure. In other words, calibration of one or more gas chromatographs may be performed by decreasing or increasing the concentration(s) of one or more analytes of a sample gas appropriately to cover the range of the gas chromatograph.

While some of the figures specifically refer to drilling systems, it should be understood that the principles herein taught with respect to automatic dilution using an information handling system for calibrating one or more gas chromatographs are not limited only to drilling systems.

FIG. 1 illustrates a drilling system 100. As illustrated, drilling system 100 may include a drilling platform 106 may support a derrick 108 having a traveling block 110 for raising and lowering drill string 112. Drill string 112 may include, but is not limited to, drill pipe and coiled tubing, as generally known to those skilled in the art. A kelly 114 may support drill string 112 as it may be lowered through a rotary table 116. A drill bit 118 may be attached to the distal end of drill string 112 and may be driven either by a downhole motor and/or via rotation of drill string 112 from surface 132. Without limitation, drill bit 118 may include roller cone bits, PDC bits, natural diamond bits, any hole openers, reamers, coring bits, and the like. As drill bit 118 rotates, it may create and extend wellbore 101 that penetrates various subterranean formations 104.

Generally, wellbore 101 may include horizontal, vertical, slanted, curved, and other types of wellbore geometries and orientations. Wellbore 101 may be cased or uncased. In examples, wellbore 101 may include a metallic material. By way of example, the metallic member may be a casing, liner, tubing, or other elongated steel tubular disposed in wellbore 101.

As illustrated, wellbore 101 may extend through subterranean formation 104. As illustrated in FIG. 1, wellbore 101 may extend generally vertically into the subterranean formation 104, however wellbore 101 may extend at an angle through subterranean formation 104, such as for horizontal and slanted wellbores. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

With continued reference to FIG. 1, a pump 120 may circulate drilling fluid through a feed pipe 122 to kelly 114, downhole through interior of drill string 112, through orifices in drill bit 118, back to surface 132 via annulus 124 surrounding drill string 112, and into a retention pit 126. Drill string 112 may begin at wellhead 102 and may traverse wellbore 101. Drill bit 118 may be attached to a distal end of drill string 112 and may be driven, for example, either by a downhole motor and/or via rotation of drill string 112 from surface 132. Drill bit 118 may be a part of bottom hole assembly 128 at distal end of drill string 112.

As illustrated, drilling system 100 may include gas extraction system 200. Gas extraction system 200 may include a gas extractor, to be discussed later in detail. As illustrated, gas extraction system 200 may be configured to receive sampled drilling fluid from feed pipe 122, however, it should be understood that gas extraction system 200 may be alternatively configured to extract dissolved gas of any of the fluids passing through any part of drilling system 100. At the surface 132, circulated fluid exits annulus 124 and may be conveyed, continuously or periodically, to gas extraction system 200. As will be also discussed later in detail, one or more gas chromatograph(s) are coupled to gas extraction system 200 for performing gas chromatography on the sample gas extracted by gas extraction system 200.

Systems and methods of the present disclosure may be implemented, at least in part, with information handling system 146. Information handling system 146 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 146 may be a personal computer, two or more computers working in a network, a network storage device, or any other suitable device and may vary in size, shape, performance, functionality, and price. Information handling system 146 may include random access memory (RAM), one or more processing resources such as a central processing unit (CPU) 148 or hardware or software control logic, ROM, and/or other types of nonvolatile memory. Additional components of the information handling system 146 may include one or more disk drives, one or more network ports for communication with external devices as well as an input device 150 (e.g., keyboard, mouse, etc.) and output devices, such as a video display 152. Information handling system 146 may also include one or more buses operable to transmit communications between the various hardware components.

Alternatively, or additionally, systems and methods of the present disclosure may be implemented, at least in part, with non-transitory computer-readable media 154. Non-transitory computer-readable media 154 may include any instrumentality or aggregation of instrumentalities that may retain data and/or instructions for a period of time. Non-transitory computer-readable media 154 may include, for example, storage media such as a direct access storage device (e.g., a hard disk drive or floppy disk drive), a sequential access storage device (e.g., a tape disk drive), compact disk, CD-ROM, DVD, RAM, ROM, and electrically erasable programmable read-only memory (EEPROM), and/or flash memory. In examples, communications media may be used to move information from one non-transitory computer-readable media 154 to another. Communications media may comprise wires, optical fibers, microwaves, radio waves, and other electromagnetic and/or optical carriers; and/or any combination of the foregoing.

As illustrated, communication link 130 (which may be wired or wireless, for example) may be provided that may transmit data from downhole tool 138, gas extraction module 200, and one or more gas chromatographs operationally coupled to gas extraction module 200 to an information handling system 146 at surface 132. Information handling system 146 may include a central processing unit 148, a video display 152, an input device 150 (e.g., keyboard, mouse, etc.), and/or non-transitory computer-readable media 154 (e.g., optical disks, magnetic disks) that may store code representative of the methods described herein. In addition to, or in place of processing at surface 132, processing may occur downhole.

Figure 2:
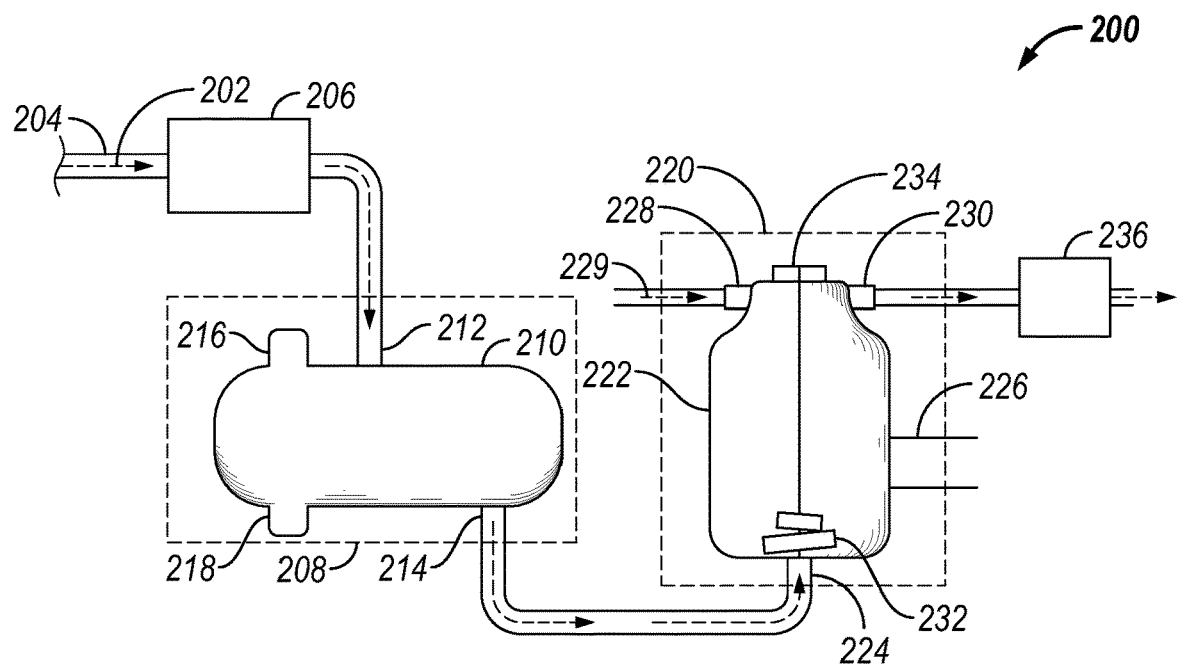
FIG. 2 illustrates a system for performing gas extraction and gas analysis, in accordance with one or more examples of the present disclosure.

FIG. 2 is a diagram of an example gas extraction system 200 that extracts gases from a drilling fluid sample, according to some examples. The gas extraction system 200 may be included with a drilling system such as the drilling system 100 and may be in selective fluid communication with a flow of drilling fluid through the drilling system, such as at access points similar to those described with reference to FIG. 1. In the example shown, the gas extraction system 200 may receive a drilling fluid sample 202 through a fluid conduit or pipe 204 that is in selective fluid communication with the flow of drilling fluid. As described above, drilling fluid samples may be taken periodically or continuously from the flow of drilling fluid through a fluid circulation system during drilling operation, and drilling fluid sample 202 may comprise one of those continuous or periodic samples. The gas extraction system 200 may comprise a pump 206 that pushes the drilling fluid sample toward a sample-temperature controller 208 of the gas extraction system 200. Sample-temperature controller 208 may be configured to alter or maintain the temperature of drilling fluid sample 202 at a set temperature, which may be hotter, cooler, or the same as the temperature of sample 202 as it enters the gas extraction system 200. In the example shown, sample-temperature controller 208 comprises a shell and tube heat exchanger with two sets of fluid inlets and outlets: a first inlet 212 and first outlet 214, and a second inlet 216 and second outlet 218. One or more set of fluid inlets and outlets may correspond to a different, segregated fluid pathway through shell 210. For example, the second inlet 216 and second outlet 218 may correspond to a fluid pathway comprising a system of sealed tubes (not shown) located within shell 210, and the first inlet 212 and first outlet 214 may correspond to a fluid pathway in which fluid flows around the system of sealed tubes. The system of sealed tubes may comprise u-tubes, single-pass straight tubes, double-pass straight tubes, or other configurations.

In certain examples, sample 202 may enter shell 210 through first inlet 212 and exit through first outlet 214. A second fluid or gas may enter shell 210 through second inlet 216 and exit through second outlet 218. Either the second fluid or drilling fluid sample 202 may flow through the system of sealed tubes. The second fluid may be at or near a desired set temperature for drilling fluid sample 202, and energy transfer may occur between sample 202 and the second fluid through the tubes, which may conduct thermal energy, until sample 202 has reached the desired set temperature. Notably, although a shell and tube heat exchanger are described herein, sample-temperature controller 208 may comprise other types of heat exchangers, including, but not limited to, thermoelectric, electric, and finned tube heat exchanger that are driven by electricity, gas, or liquid; u-tube heat exchangers; etc.

Once at or near the set temperature, drilling fluid sample 202 may be received at a gas extractor 220 of the gas extraction system 200, the gas extractor 220 being in fluid communication with sample-temperature controller 208. Example gas extractors include, but are not limited to, continuously stirred vessels, distillation columns, flash columns, separator columns, or any other vessel that allows for the separation and expansion of gas from liquids and solids. In the example shown, the gas extractor 220 comprises a vessel 222 that receives sample 202 through a fluid inlet 224 and further comprises a fluid outlet 226 through which a portion of sample 202 will flow after a gas extraction process. The gas extractor 220 may further comprise impeller 232 within vessel 222 to agitate sample 202 as it enters vessel 222. The impeller 232 may be driven by a motor 234 that rotates the impeller to create a turbulent flow of sample 202 within vessel, which causes gases trapped within the solids and liquids of sample 202 to be released into vessel 222. Although impeller 232 is shown it is possible to use other types of agitators.

Gases within vessel 222 that are released from sample 202 through the agitation process may be removed from vessel through a gas outlet 230. In certain examples, vessel 222 may comprise a gas inlet 228, and at least one carrier gas 229 may be introduced into vessel 222 through the gas inlet 228. Carrier gases 229 may comprise atmospheric or purified gases that are introduced into vessel 222 to aide in the movement of the extracted gases to a gas outlet 230. The carrier gases may have known chemical compositions such that their presence can be accounted for when the extracted gases from gas outlet 230 are analyzed. Suitable gases to be used as carrier gas include, without limitation, nitrogen ($N_2$), helium (He), hydrogen ($H_2$), noble gases, combinations thereof, and the like.

Although sample-temperature controller 208 and gas extractor 220 are shown as separate devices, it may be possible to combine the functionality into a single device. For example, heat exchange may be accomplished through vessel 222, bringing sample 202 to a set temperature while it is in vessel 222. In other examples, sample-temperature controller 208 may be optional, and sample 202 may be directed to the extractor 220 without flowing through sample-temperature controller 208. In certain examples, the gas outlet 230 of the extractor 220 may be coupled to a pump 236 which may deliver the extracted gas sample out from the extractor 220.

One or more gas chromatographs may be operationally coupled to gas outlet 230. Gas chromatography may be performed on the extracted gas sample with one or more gas chromatographs. To this end, FIGS. 3A-3G illustrate a gas extraction and chromatography system 300 including an automated dilution system 307 as well as various exemplary arrangements thereof.

Figure 3A:
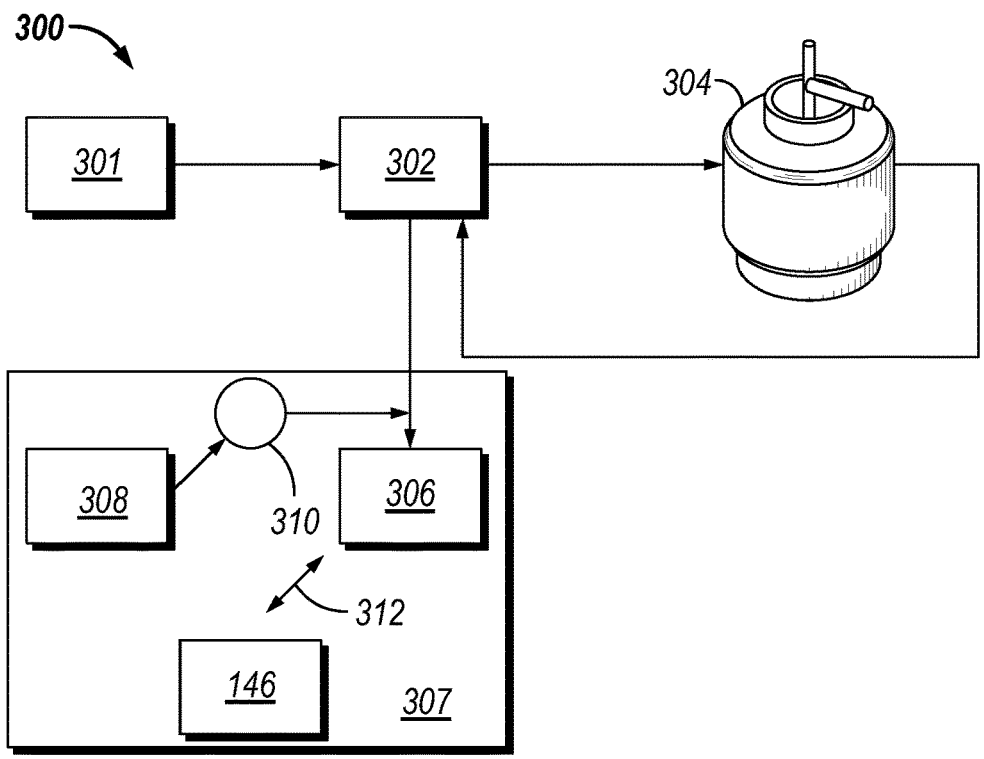
FIG. 3A illustrates a system for performing calibration of a gas chromatograph, in accordance with one or more examples of the present disclosure.

FIG. 3A illustrates gas extraction and chromatography system 300 for performing gas extraction and analysis on a drilling fluid sample 301, according to one or more examples. Gas extraction and chromatography system 300 includes gas extraction system 302, gas chromatograph 306, information handling system 146, diluent source 308, flow control device 310, and optionally, vessel 304. An example of the gas extraction system 302 is the gas extraction system 200 illustrated in FIGS. 1 and 2. Accordingly, the gas extraction and chromatography system 300 of FIG. 3 may comprise the gas extraction system 200 in FIG. 1, such that gas extraction and chromatography are performed in real-time during drilling and circulating drilling fluid through drilling system 100. A drilling fluid sample 301 is input into the gas extraction system 302. Once the measured concentration of at least one type of species reaches a threshold, the gas extraction system 302 inputs the drilling fluid sample 301 into vessel 304. For example, once a measured concentration species reaches 100 parts per million (PPM) for the drilling fluid sample, the gas extraction system 302 can input the drilling fluid sample into vessel 304. Also, an output of the gas extraction system 302 such as the gas output from gas outlet 230 in FIG. 2 is coupled to an input of gas chromatograph 306 that is configured to measure or otherwise determine concentrations of species based on the extracted gas received from gas extraction system 302. Storage of the sample in vessel 304 can minimize dissolved formational gas loss.

Additionally, an output of vessel 304 is coupled back to an input of the gas extraction system 302. The drilling fluid sample can then be recirculated through the gas extraction system 302 continuously to extract dissolved gas while flowing extracted gas extracted in a gas extractor within gas extraction system 302 (e.g., gas extractor 220) to gas chromatograph 306 for concentration measurement and other analysis. Gas chromatograph 306 may be configured to determine concentration of one or more species of the extracted gas over time.

In some examples, gas chromatograph 306 is configured to determine species of the drilling fluid sample that includes methane, ethane, propane, isobutane, butane, isopentane, and pentane. Information handling system 146 is communicatively coupled to any individual component and/or combination of components of gas extraction and chromatography system 300 including, without limitation, gas extraction system 302, flow control device 310, diluent source 308, gas chromatograph 306, and any combination thereof. For example, information handling system 146 is communicatively coupled to receive values of the concentration of one or more species of the extracted gas over time from gas chromatograph 306. As further described below, information handling system 146 may be configured to modify a dilution rate with flow control device 310, store and/or analyze data of gas chromatograph 306, plot concentrations of one or more species versus time, and the like. Information handling system 146 may also be configured to generate a response signal per analyte concentration curve for one or more components of sample gas based on, for example, periodic measurements of gas chromatograph 306.

Gas extraction and chromatography system 300 may be equipped with a syringe, an automated injection system (e.g., autosampler), diffuser, injector, or the like, for injection sample gas into a mobile phase (i.e., "carrier gas"). An effluent 316 of gas extraction system 302 may thus comprise or be combined with carrier gas. In addition, an effluent 316 of gas extraction system 302 may consist of undiluted sample gas to be later diluted with diluent and then injected into a carrier gas. Yet alternatively, sample gas of gas extraction system 302 may be first injected into a carrier gas and later diluted with diluent. While FIG. 3 only simply shows a diluent source 308 in fluidic communication with an effluent of gas extraction system 302, it should be understood that the order and manner by which dilution with flow control device 310 is performed may vary to suit a particular application.

Flow control device 310 is a device that controls the flow of diluent to a gas entering gas chromatograph 306. In examples, flow control device 310 comprises a mass flow controller (MFC). In this way, composition of a gas being measured by gas chromatograph 306 may be controlled over time as flow control device 310 varies the concentration of analyte(s). Alternative, non-limiting examples of suitable controllers to be used as flow control device 310 include thermal mass flow controllers, Coriolis gas flow controllers, differential pressure mass flow controllers, volumetric mass flow controllers, pressure-based mass flow controllers, sonic nozzle mass flow controllers, MEMS-based (microelectromechanical systems-based) mass flow controllers, combinations thereof, and the like. In addition to controlling flow, flow control device 310 may also be equipped with sensors to monitor the flow. Such measurements with flow sensors may be transmitted or relayed to information handling system 146. Flow sensors may include, for example, differential pressure (DP) sensors, thermal sensors, Coriolis flow sensors, electromagnetic flow sensors, ultrasonic flow sensors, vortex shedding sensors, positive displacement sensors, turbine flow sensors, pressure sensors, combinations thereof, and the like.

As illustrated, an effluent of gas extraction system 302 is in an at least partial fluidic communication with diluent source 308 via flow control device 310. This allows diluent to be added to the effluent prior to entering gas chromatograph 306, thus enabling precise control of the one or more analytes of the sample gas with information handling system 146.

Diluent source 308 comprises one or more diluents. Diluent serves to vary the concentration of the one or more analytes of a gas being measured by gas chromatograph 306 such that a gas is analyzed for a range of analyte concentrations. As discussed, this range of concentrations allows calibration curves to be rendered from the various response signals produced by gas chromatograph 306. Diluent source 308 may be housed within a vessel, such as a diffusion tube, for example. As used herein, a "diffusion tube" refers to one or more vessels that are configured to release a gas or liquid at a specific rate. In examples, the specific rate may be known, may be controlled (e.g., by information handling system 146), and may allow for at least the initial concentration of a sample entering gas chromatograph 306 to be known. Diluent source 308 may comprise one or more liquids having a known vapor pressure, a known temperature, and/or a known absolute pressure, e.g., from one or more sensor measurements.

Selection of one or more species for a diluent may be useful for generating the appropriate calibration curves for a particular sample gas, analyte, and/or combination of analytes in a gas. A diluent may comprise or consist of an inert species. Alternatively, or in addition, the diluent may include one or more species of interest, e.g., pentane. In one example, the diluent consists of $N_2$ and pentane. Non-limiting examples of suitable components to be included in the diluent include any of methane, ethane, propane, butane, isobutane, pentane, isopentane, hexane, a $C_1$ to $C_{15}$ hydrocarbon, alkanes, alkenes, combinations thereof, and the like.

As previously mentioned, rather than being directly fluidically to the effluent of gas extraction system 302, diluent may instead be passed via flow control device 310 directly to gas chromatograph 306 such that diluent and gas are combined within gas chromatograph 306. Yet alternatively, diluent may be separately injected into carrier gas, such as in a separate mixer or conduit, and then used to dilute the effluent of gas extraction system 302. In such examples, a single or a plurality of flow control devices 310 may be used. To this end, FIGS. 3B-3G illustrate various example arrangements of automated dilution system 307 in accordance with various examples of the present disclosure.

Figure 3B:
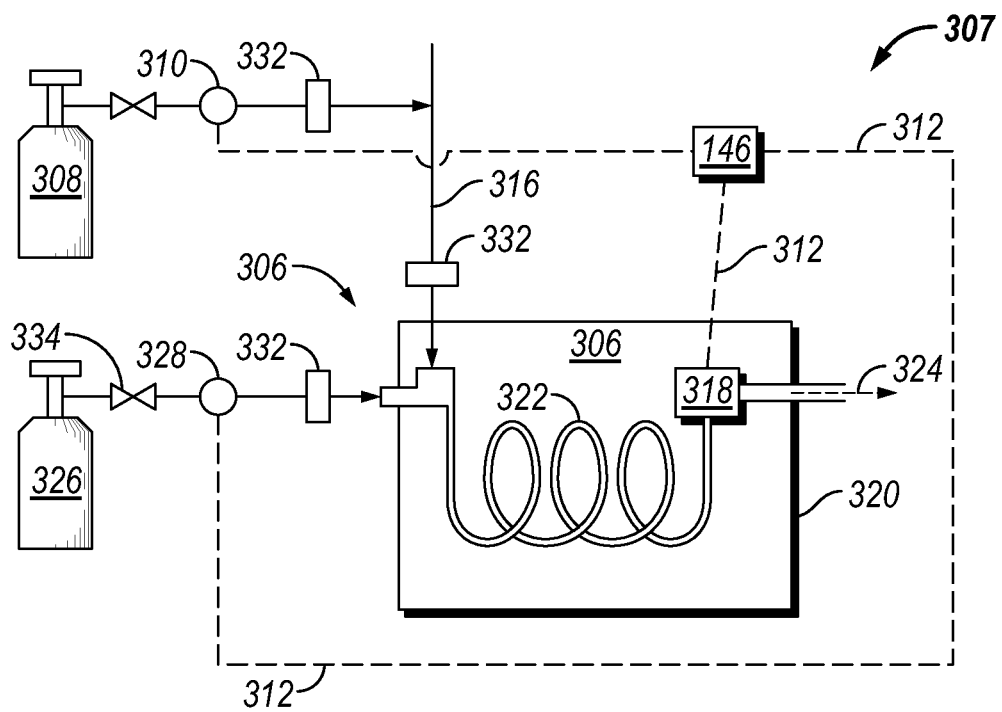
FIGS. 3B-3G are illustrative examples of different automated dilution systems, in accordance one or more examples of the present disclosure.

FIG. 3B is an example arrangement of an automated dilution system 307 for performing calibration of gas chromatograph 306, in accordance with one or more examples of the present disclosure. As illustrated, automated dilution system 307 generally comprises gas chromatograph 306, diluent source 308, and information handling system 146.

Gas chromatograph 306 generally includes one or more chromatographic columns 322, and one or more detectors 318. As alluded to previously, gas chromatograph 306 relies on the separating of analyte(s) by injecting a gas into an inert carrier gas, and then passing the carrier gas through a stationary phase. The stationary phase, which may be disposed within the chromatographic separation columns (e.g., fused silica capillaries), causes the various species within the gas to separate based on intermolecular interactions between the various species and the lining and/or filling of the columns. The columns may be contained within a temperature-controlled column. The separated species that exit out the end of the column may be detected and analyzed, and the analysis used to infer the chemical composition of the gas.

As illustrated, chromatographic column 322 and detector 318 may be disposed within column oven 320. Stationary phase may be coated on the inside of chromatographic column 322, for example, as a very fine powder. Choice of an appropriate stationary phase may be made in accordance with the identity of one or more analytes, and may consider factors such as polarity, molecular weight, thermal stability, and the like. Column oven 320 allows gas to be analyzed at a controlled temperature, ensuring reliable measurements. In operation, diluted gas is carried by a carrier gas through chromatographic column 322 where components of the gas are at least partially separated. The separated gas is detected by detector 318, and the raw measurements of detector 318 may be processed by information handling system 146.

Exemplary and non-limiting detectors which may be used as detector 318 include: flame ionization detector (FID), thermal conductivity detector (TCD), alkali flame detector (AFD), alkali flame ionization detector (AFID), flame photometric detector (FPD), catalytic combustion detector (CCD), discharge ionization detector (DID), electron capture detector (ECD), nitrogen-phosphorus detector (NPD), dry electrolytic conductivity detector (DELCD), mass spectrometer (MS or GC-MS), vacuum ultraviolet (UVU), electrolytic conductivity detector (EICD), helium ionization detector (IRD), photo-ionization detector (PID), pulsed discharge ionization detector (PDD), thermionic ionization detector (TID), and any combinations thereof. Detector 318 may alternatively comprise any suitable device for detection of analytes after chromatographic column 322. Depending on the composition of a gas being measured, detection of analytes with detector 318 produces a response signal. As mentioned, gas is diluted with diluent from a diluent source 308 in order to measure across a range of analyte concentrations before being analyzed by detector 318 and leaving as a waste effluent 324.

Diluent source 308 may be fluidically coupled directly to effluent 316. Effluent 316 is an effluent of gas extraction system 302 and comprises at least one component of (e.g., the entirety of) an extracted dissolved gas of the extraction system 302 (e.g., referring to FIG. 3A). Effluent 316 may be treated (e.g., separated), or untreated. As illustrated, diluent is used to dilute effluent 316 at a controlled rate with flow control device 310. Flow control device 310, flow control device 328, and detector 318 may be communicatively coupled with information handling system 146 via communication link 312. Communication link 312 may be two-directional, capable of receiving and/or relaying both data, signals, and information to and from the flow control devices, sensors, detectors, etc., of automated dilution system 307.

Sensors 332 may also be included at various locations of automated dilution system 307, which may also be communicatively coupled to information handling system 146 via communication link 312. Sensors 332 may include, to use non-limiting examples, gas flow meters, temperatures sensors, pressure gauges, analyte sensors, or the like. Where used, sensors 332 may provide information handling system 146 with information relating to temperature of an incoming gas, analyte concentration, flow rate, temperature, pressure, etc., which may be used to inform the analysis performed by information handling system 146. For example, knowing the concentration of a target or non-target analyte in a diluent may help correctly map a response signal of detector 318 to an analyte concentration in a gas when rendering a calibration curve. Similarly, knowing the velocity of gases traveling through interconnecting conduits between diluent source 308, carrier gas source 326, effluent 316 and gas chromatograph 306 may further assist information handling system 146 to assign the appropriate analyte concentration associated with a measurement of detector 318 when generating a calibration curve.

Carrier gas source 326 may be fluidically coupled to gas chromatograph 306 at an inlet of gas chromatograph 306, as shown. Carrier gas from carrier gas source 326 flows through gas chromatograph 306 to carry injected diluted gas through chromatographic column 322, where the various chemical components are at least partially separated. Flow of carrier gas may be regulated and/or monitored by pressure regulator 334 and flow control device 328, either of which may be communicatively coupled to information handling system 146 by communication link 312, as illustrated. In this way, flow of gas through automated dilution system 307 may be closely monitored and controlled.

Figure 3C:
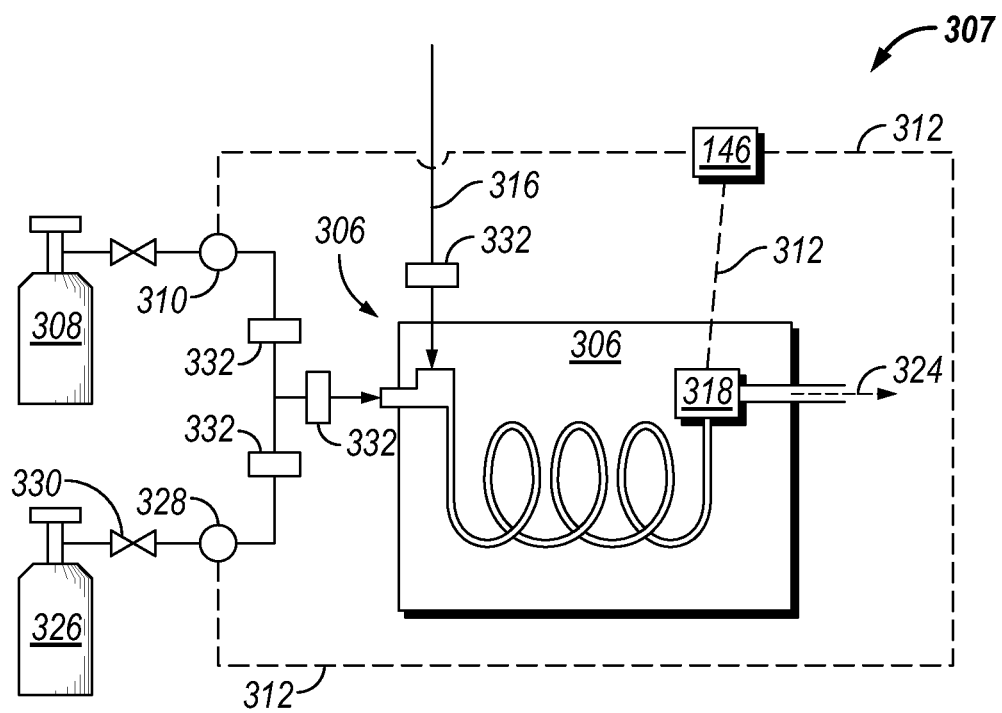

FIG. 3C is an example arrangement of an automated dilution system 307 for performing calibration of a gas chromatograph 306, in accordance with one or more examples of the present disclosure. FIG. 3C shows how diluent of diluent source 308 and carrier gas of carrier gas source 326 may be combined prior to combination with the effluent 316. This may, in some examples, result in even mixing of the diluent and carrier gas prior to introduction to chromatographic column 322, as well as avoid spikes and dips in concentrations.

Figure 3D:
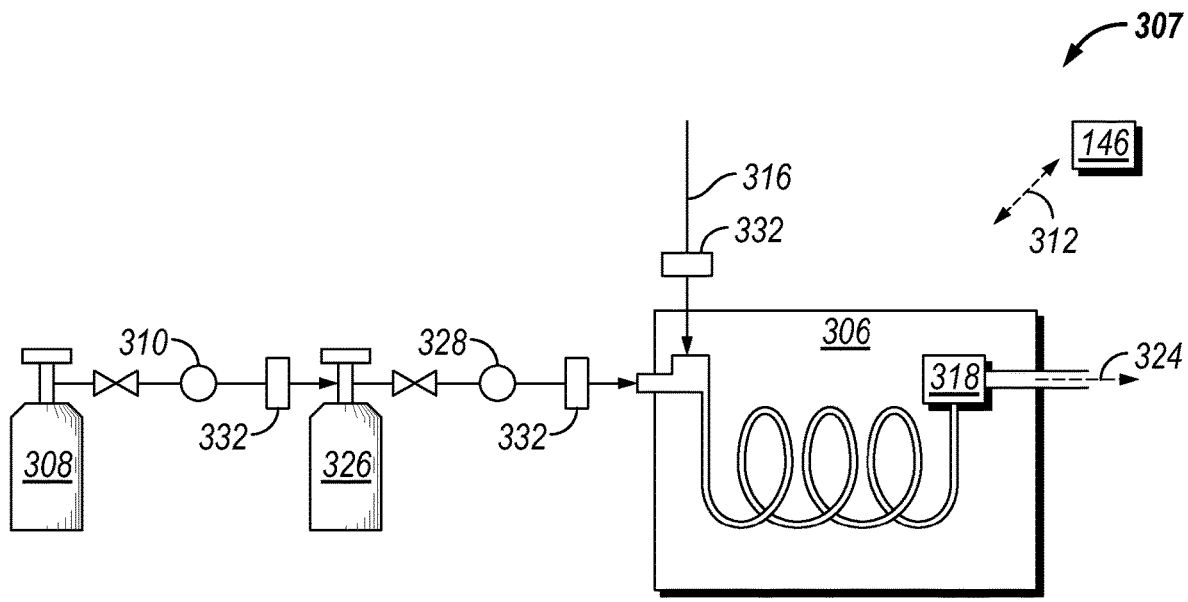

FIG. 3D is an example arrangement of an automated dilution system 307 for performing calibration of a gas chromatograph 306, in accordance with one or more examples of the present disclosure. FIG. 3D shows how diluent source 308 and carrier gas source 326 may be connected in series. This may, in some examples, result in even mixing of the diluent and carrier gas prior to introduction to chromatographic column 322, as well as avoid spikes and dips in concentrations.

Figure 3E:
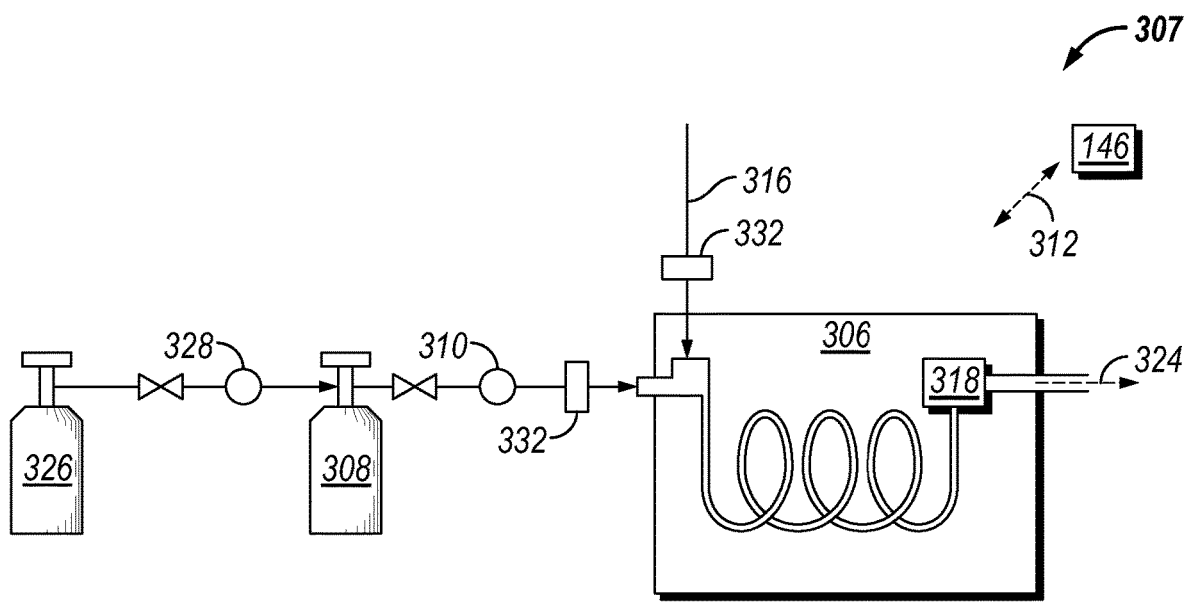

FIG. 3E is an example arrangement of an automated dilution system 307 for performing calibration of a gas chromatograph 306, in accordance with one or more examples of the present disclosure. FIG. 3E shows how diluent source 308 may be connected in series after carrier gas source 326. This may, in some examples, result in even mixing of the diluent and carrier gas prior to introduction to chromatographic column 322, as well as avoid spikes and dips in concentrations.

Figure 3F:
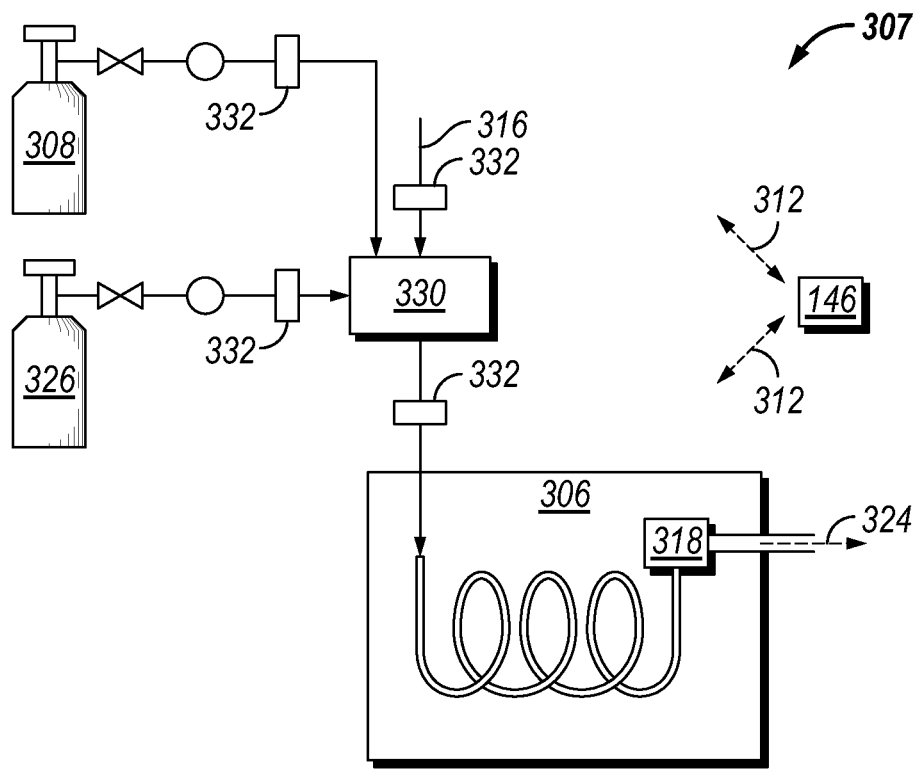

FIG. 3F is an example arrangement of an automated dilution system 307 for performing calibration of a gas chromatograph, in accordance with one or more examples of the present disclosure. FIG. 3F shows how combining diluent, carrier gas, and effluent 316 may occur in a mixing chamber 330 prior to entry into gas chromatograph 306. This arrangement may, in some examples, result in even mixing of the diluent and carrier gas prior to introduction to chromatographic column 322, as well as avoid spikes and dips in concentrations.

Figure 3G:
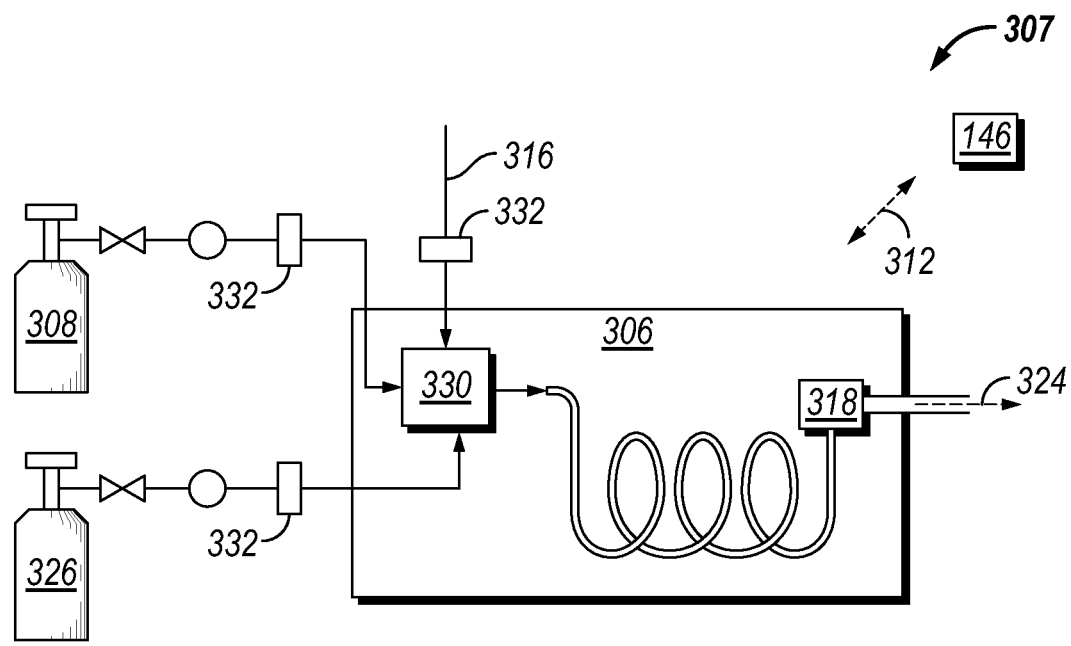

FIG. 3G is an example arrangement of an automated dilution system 307 for performing calibration of a gas chromatograph 306, in accordance with one or more examples of the present disclosure. FIG. 3G shows how mixing chamber 330 may be housed within gas chromatograph 306, wherein mixing may occur prior to entry into chromatographic column 322. This arrangement may, in some examples, result in even mixing of the diluent and carrier gas prior to introduction to chromatographic column 322, as well as avoid spikes and dips in concentrations.

While only a single diluent source is schematically shown in FIGS. 3A-3G as being fluidically coupled to a single gas chromatograph 306 via a single flow control device 310, it should be understood that there may be a plurality of diluent sources 308 and/or carrier gas sources 326. In these example, each diluent source 308 and/or carrier gas source 326 of the plurality may be stored separately in a separate vessel.

Likewise, while the interconnection between diluent source 308 and gas chromatograph 306 is schematically represented as a single conduit, a plurality of conduits (e.g., manifold) and/or a plurality of flow control devices 310 may be used to control multiple flows of diluent(s). In all cases, composition of gas being analyzed by gas chromatograph 306 is controlled by information handling system 146 by manipulating flow(s) of diluent.

As illustrated in all of FIGS. 3A-3G, various system components of gas extraction and chromatography system 300 and automated dilution system 307 may be communicatively coupled with information handling system 146 via communication link 312. In examples, measurements of gas chromatograph 306 are transmitted in real-time to information handling system 146. Communication between information handling system 146 and flow control device 310 via communication link 314 enables real-time control of the composition of gas passing being analyzed by gas chromatograph 306 by controlling the dilution rate of gas with diluent of diluent source 308. As used herein, "real-time" may be generally understood to relate to a system, apparatus, or method in which a set of input data is processed and available for use within 100 milliseconds ("ms"). In further examples, the input data may be processed and available for use within 90 ms, within 80 ms, within 70 ms, within 60 ms, within 50 ms, within 40 ms, within 30 ms, within 20 ms, or any ranges therebetween. In some examples, real-time may relate to a human's sense of time rather than a machine's sense of time. For example, processing which results in a virtually immediate output, as perceived by a human, may be considered real-time processing.

Figure 4:
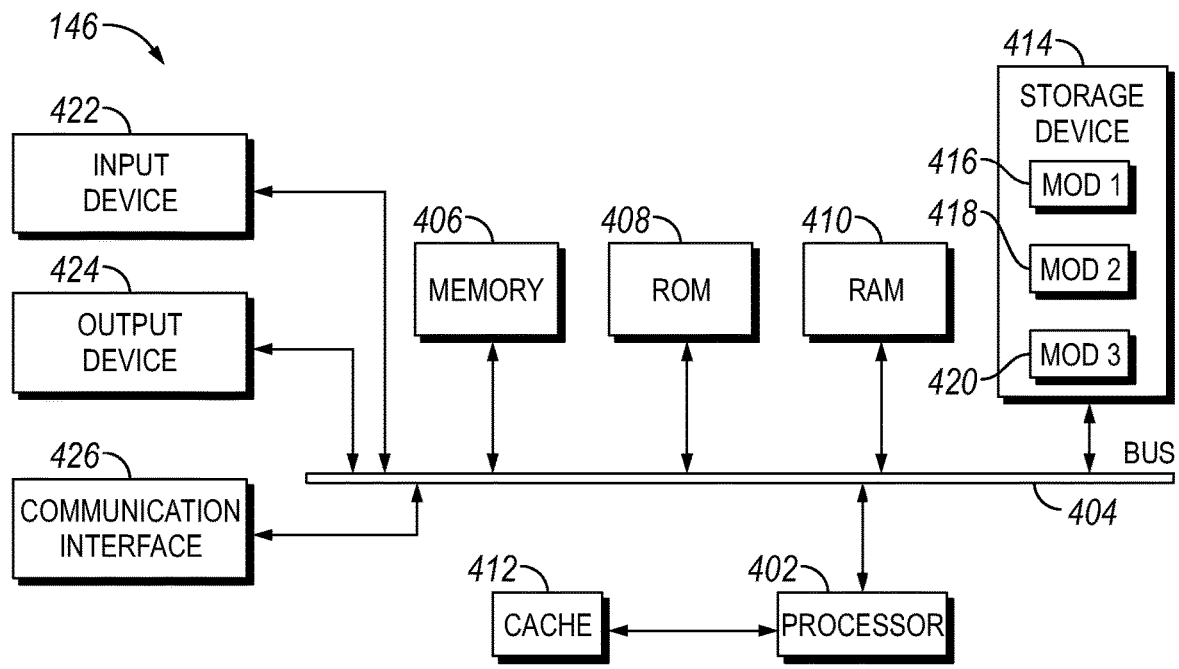
FIG. 4 is a schematic of an information handling system, in accordance with one or more examples of the present disclosure.

FIG. 4 illustrates an example information handling system 146 which may be employed to perform various steps, methods, and techniques disclosed herein. Persons of ordinary skill in the art will readily appreciate that other system examples are possible. As illustrated, information handling system 146 comprises a processing unit (CPU or processor) 402 and a system bus 404 that couples various system components including system memory 406 such as read only memory (ROM) 408 and random-access memory (RAM) 410 to processor 402. Processors disclosed herein may all be forms of this processor 402. Information handling system 146 may comprise a cache 412 of high-speed memory connected directly with, in close proximity to, or integrated as part of processor 402. Information handling system 146 copies data from memory 406 and/or storage device 414 to cache 412 for quick access by processor 402. In this way, cache 412 provides a performance boost that avoids processor 402 delays while waiting for data. These and other modules may control or be configured to control processor 402 to perform various operations or actions. Other system memory 406 may be available for use as well. Memory 406 may comprise multiple different types of memory with different performance characteristics. It may be appreciated that the disclosure may operate on information handling system 146 with more than one processor 402 or on a group or cluster of computing devices networked together to provide greater processing capability. Processor 402 may comprise any general-purpose processor and a hardware module or software module, such as first module 416, second module 418, and third module 420 stored in storage device 414, configured to control processor 402 as well as a special-purpose processor where software instructions are incorporated into processor 402. Processor 402 may be a self-contained computing system, containing multiple cores or processors, a bus, memory controller, cache, etc. A multi-core processor may be symmetric or asymmetric. Processor 402 may comprise multiple processors, such as a system having multiple, physically separate processors in different sockets, or a system having multiple processor cores on a single physical chip. Similarly, processor 402 may comprise multiple distributed processors located in multiple separate computing devices but working together such as via a communications network. Multiple processors or processor cores may share resources such as memory 406 or cache 412 or may operate using independent resources. Processor 402 may comprise one or more state machines, an application specific integrated circuit (ASIC), or a programmable gate array (PGA) including a field PGA (FPGA).

One or more individual component discussed above may be coupled to system bus 404, which may connect one or more and every individual component to one or more other. System bus 404 may be any of several types of bus structures including a memory bus or memory controller, a peripheral bus, and a local bus using any of a variety of bus architectures. A basic input/output (BIOS) stored in ROM 408 or the like, may provide the basic routine that helps to transfer information between elements within information handling system 146, such as during start-up. Information handling system 146 further comprises storage devices 414 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 414 may comprise software modules 416, 418, and 420 for controlling processor 402. Information handling system 146 may comprise other hardware or software modules. Storage device 414 is connected to the system bus 404 by a drive interface. The drives and the associated computer-readable storage devices provide nonvolatile storage of computer-readable instructions, data structures, program modules and other data for information handling system 146. In one aspect, a hardware module that performs a particular function comprises the software component stored in a tangible computer-readable storage device in connection with the necessary hardware components, such as processor 402, system bus 404, and so forth, to carry out a particular function. In another aspect, the system may use a processor and computer-readable storage device to store instructions which, when executed by the processor, cause the processor to perform operations, a method, or other specific actions. The basic components and appropriate variations may be modified depending on the type of device, such as whether information handling system 146 is a small, handheld computing device, a desktop computer, or a computer server. When processor 402 executes instructions to perform "operations", processor 402 may perform the operations directly and/or facilitate, direct, or cooperate with another device or component to perform the operations.

As illustrated, information handling system 146 employs storage device 414, which may be a hard disk or other types of computer-readable storage devices which may store data that are accessible by a computer, such as magnetic cassettes, flash memory cards, digital versatile disks (DVDs), cartridges, random access memories (RAMs) 410, read only memory (ROM) 408, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 146, an input device 422 represents any number of input mechanisms, such as a microphone for speech, a touch-sensitive screen for gesture or graphical input, keyboard, mouse, motion input, speech and so forth. An output device 424 may also be one or more of a number of output mechanisms known to those of skill in the art. In some instances, multimodal systems enable a user to provide multiple types of input to communicate with information handling system 146. Communications interface 426 generally governs and manages the user input and system output. There is no restriction on operating on any particular hardware arrangement and therefore the basic hardware depicted may easily be substituted for improved hardware or firmware arrangements as they are developed.

As illustrated, one or more individual components described above is depicted and disclosed as individual functional blocks. The functions these blocks represent may be provided through the use of either shared or dedicated hardware, including, but not limited to, hardware capable of executing software and hardware, such as a processor 402, that is purpose-built to operate as an equivalent to software executing on a general-purpose processor. For example, the functions of one or more processors presented in FIG. 4 may be provided by a single shared processor or multiple processors. (Use of the term "processor" should not be construed to refer exclusively to hardware capable of executing software.) Illustrative examples may comprise microprocessor and/or digital signal processor (DSP) hardware, read-only memory (ROM) 408 for storing software performing the operations described below, and random-access memory (RAM) 410 for storing results. Very large-scale integration (VLSI) hardware examples, as well as custom VLSI circuitry in combination with a general-purpose DSP circuit, may also be provided.

Figure 5:
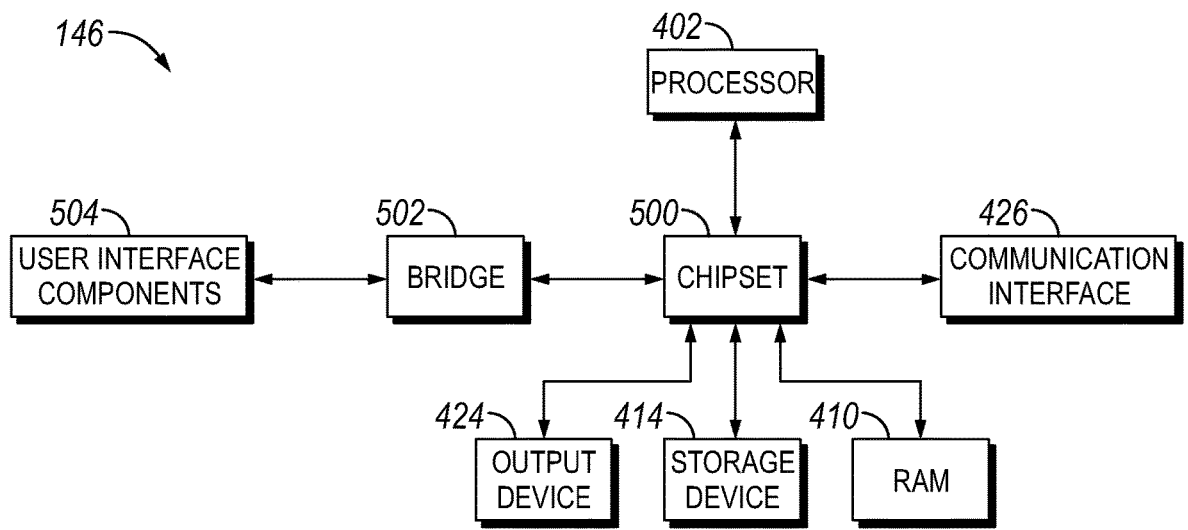
FIG. 5 is a schematic of a chip set for an information handling system, in accordance with one or more examples of the present disclosure.

FIG. 5 illustrates an example information handling system 146 having a chipset architecture that may be used in executing the described method and generating and displaying a graphical user interface (GUI). Information handling system 146 is an example of computer hardware, software, and firmware that may be used to implement the disclosed technology. Information handling system 146 may comprise a processor 402, representative of any number of physically and/or logically distinct resources capable of executing software, firmware, and hardware configured to perform identified computations. Processor 402 may communicate with a chipset 500 that may control input to and output from processor 402. In this example, chipset 500 outputs information to output device 424, such as a display, and may read and write information to storage device 414, which may comprise, for example, magnetic media, and solid-state media. Chipset 500 may also read data from and write data to RAM 410. Bridge 502 for interfacing with a variety of user interface components 504 may be provided for interfacing with chipset 500. User interface components 504 may comprise a keyboard, a microphone, touch detection and processing circuitry, a pointing device, such as a mouse, and so on. In general, inputs to information handling system 146 may come from any of a variety of sources, machine generated and/or human generated.

Chipset 500 may also interface with one or more communication interfaces 426 that may have different physical interfaces. Such communication interfaces may comprise interfaces for wired and wireless local area networks, for broadband wireless networks, as well as personal area networks. Some applications of the methods for generating, displaying, and using the GUI disclosed herein may comprise receiving ordered datasets over the physical interface or be generated by the machine itself by processor 402 analyzing data stored in storage device 414 or RAM 410. Further, information handling system 146 receives inputs from a user via user interface components 504 and executes appropriate functions, such as browsing functions by interpreting these inputs using processor 402.

In examples, information handling system 146 may also comprise tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may comprise RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be comprised within the scope of the computer-readable storage devices.

Computer-executable instructions comprise, for example, instructions and data which cause a general-purpose computer, special purpose computer, or special purpose processing device to perform a certain function or group of functions. Computer-executable instructions also comprise program modules that are executed by computers in stand-alone or network environments. Generally, program modules comprise routines, programs, components, data structures, objects, and the functions inherent in the design of special-purpose processors, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

During calibration of a gas chromatograph or during use of a calibrated gas chromatograph in accordance with the present disclosure, information handling system 146 may process different types of the real-time data and post-process data originated from varied sampling rates and various sources, such as diagnostics data, sensor measurements, gas chromatograph detector measurements, pressure/flow measurements, operations data, and or the like as collected by drilling system 100, gas extraction system 200, and/or gas extraction and chromatography system 300. (e.g., referring to FIGS. 1-3). These measurements (m) from drilling system 100 may allow for information handling system 146 to perform real-time assessments of the drilling system 100 gas extraction system 200, and/or gas extraction and chromatography system 300.

In addition to performing real-time analysis of a gas of drilling system 100, the methods and systems described herein may be configured to perform calibration of one or more gas chromatographs. While calibration of a gas chromatograph is generally shown as occurring in real-time during operation of drilling system 100 (e.g., referring to FIG. 1), it should be understood that the drilling fluid samples or sample gas may be stored and carried off site to another location where gas extraction, analysis, and subsequent calibration of gas chromatograph 306 may be performed.

Figure 6:
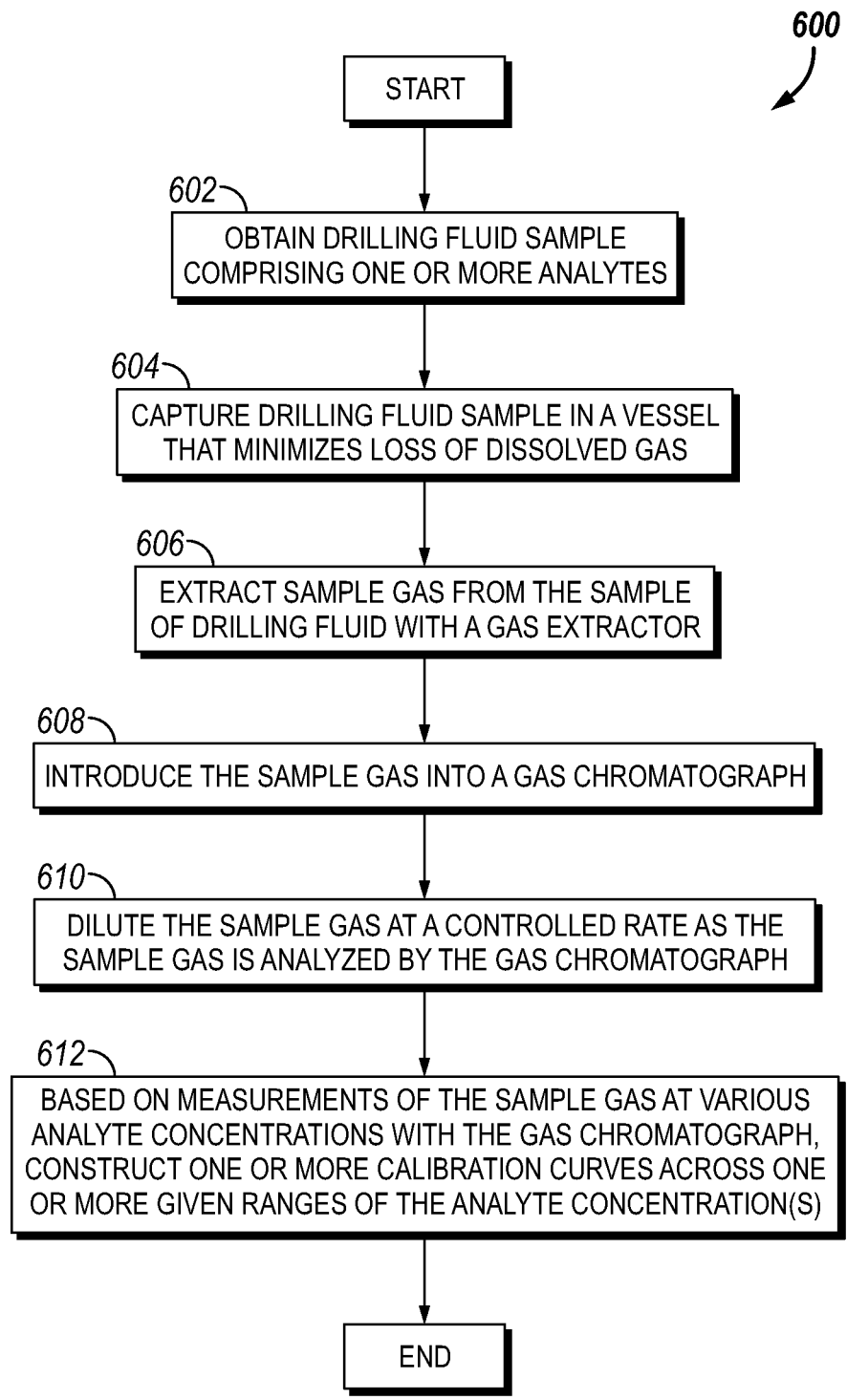
FIG. 6 illustrates a workflow for performing calibration of a gas chromatograph, in accordance with one or more examples of the present disclosure.

FIG. 6 is a workflow 600 for calibrating a gas chromatograph, in accordance with one or more examples of the present disclosure. Operations of workflow 600 may be performed in real-time by information handling system 146. The operations of workflow 600 start at block 602. It should be understood that while the individual blocks of workflow 600 are shown sequentially, for the sake of brevity, certain intervening operations may not be shown by workflow 600. Also, in some alternative examples, the order of the various blocks of workflow 600 may be rearranged as needed to suit a particular application. In yet other examples, certain blocks shown by workflow 600 may be omitted as needed to suit a particular application.

At block 602, a drilling fluid sample is received from a flow of drilling fluid returning to a surface of a borehole during drilling of the borehole in a subterranean formation. For example, the drilling fluid sample may be received from one or more access points within a drilling fluid circulation system such as depicted and described with reference to FIG. 1.

At block 604, the drilling fluid sample is optionally captured in a vessel that minimizes dissolved formational gas loss. For example, with reference to FIG. 3, the extraction system 302 outputs the drilling fluid sample for storage in vessel 304 that is pressure sealed to minimize loss of formation gas.

At block 606, the drilling fluid sample is circulated and recirculated through the gas extractor to extract dissolved gas. For example, with reference to FIG. 3, the gas extraction system 302 receives the drilling fluid sample back from vessel 304 to be recirculated through the gas extraction system 302 to extract dissolved gas from the drilling fluid sample.

At block 608, extracted dissolved gas input into a gas chromatograph. For example, with reference to FIG. 3, the gas extraction system 302 inputs the extracted dissolved gas (i.e., "sample gas") into gas chromatograph 306. Sample gas may be input directly into gas chromatograph 306 or may be first combined with either or both a carrier gas and diluent from diluent source 308. Alternatively, sample gas may be combined with (e.g., injected into) a carrier gas, and the combined carrier gas and sample gas may be diluted at or before gas chromatograph 306. Yet alternatively, carrier gas may be diluted with diluent from diluent source 308 and the sample gas then added (e.g., injected) into the carrier gas comprising the diluent at or before gas chromatograph 306.

At block 610, one or more gases comprising the sample gas are diluted at a controlled dilution rate and analyzed by the gas chromatograph. As gas is introduced into gas chromatograph 306 (e.g., referring to FIGS. 3A-3G), it is diluted with diluent from diluent source 308 at a dilution rate. Dilution over time allows for a range of analyte concentration to be analyzed over time. Dilution rate is controlled by information handling system 146 and may be constant, modified incrementally, modified continuously, or modified dynamically. As used herein, "dynamic modification" of a dilution rate refers to modifying of the dilution rate with information handling system 146 while calibration is being performed and based on at least one real-time changing parameter. Controlling the dilution rate ensures that the concentration of one or more analytes of the gas over time is known.

Dilution is performed by inputting diluent into gas chromatograph 306 at controlled rate(s) such that concentration of one or more components of the gas varies across a given range with time. Response signals are produced by gas chromatograph 306 in proportion to concentration(s) of one or more analytes at a given time. The higher the density of measurements (e.g., measurements per unit concentration), the more accurate the calibration curve(s). The analyte concentration range evaluated by gas chromatograph 306 depends on the type of chromatograph as well as the identity of the analyte(s) being measured, however, may be between 0 and 1 (i.e., measured in mol fraction), or any ranges therebetween for a given analyte. For dilution, analyte concentration begins at a high value (e.g., between 0.5 and 1) and is decreased to a low value (e.g., between 0 and 0.5).

In alternative examples, rather than diluting the sample gas relative to the analyte(s), the sample gas may be concentrated. Specifically, concentration of one or more analytes of the sample gas may be increased instead of decreased in the gas entering chromatograph 306. In these alternative examples, diluent source 308 comprises a concentrate source rather than a diluent source. As previously alluded to, each and every principle taught herein with respect to a dilution rate using a diluent source 308, flow control device 310, and information handling system 146 may be equally applied as a concentration rate, a concentrate source, and information handling system 146. For concentration, analyte concentration begins at a low value (e.g., between 0 and 0.5) and is increased to a high value (e.g., between 0.5 and 1).

Dynamic modification of the dilution rate may, in some examples, be performed in real-time by information handling system 146. In some examples, dynamic modifying of the dilution rate may be based on engineering factors. Engineering factors which may influence the adjusting of the dilution rate may include, without limitation, instrument cycle time, velocity of a fluid (e.g., gas) flowing through one or more interconnecting conduits, actual measurement density (i.e., measurements per unit of concentration) compared to a target (e.g., operator-specified) measurement density on a calibration curve, any combination thereof, and the like. Another engineering factor may include an allowed time for calibration. Another engineering factor may include an amount of non-linearity or linearity of an instrument.

"Instrument cycle time," as used herein, refers to the amount of time required to complete an operational cycle. In examples, one operational cycle includes gas extraction, movement of sample gas, separation of one or more components of a gas comprising the sample gas, detection of one or more analytes with gas chromatograph 306, and data acquisition and analysis with information handling system 146. The dilution rate may be adjusted such that the amount of time it takes to perform gas chromatography and analysis for a batch of sample gas across a given concentration range is equal, or roughly equal (e.g., within 5%), to the instrument cycle time. Matching the dilution rate to the instrument cycle time may result in increased calibration efficiency, reduced time-loss, and high throughput of rendered calibration curves while still maintaining high resolution and quality of the curves.

"Allowed time for calibration," as used herein, refers to an amount of time required to perform calibration of at least gas chromatograph. In some examples, an allowed time for calibration may be preset by an operator, such as via one or more user interactions with a user interface. In other examples, an allowed time for calibration may be based on recorded timestamps of previous calibrations. In other examples, an allowed time for calibration may be predicted based on a desired calibration density.

One example of a non-linearity of an instrument is a non-linearity of a calibration curve being rendered by information handling system 146 during calibration of gas chromatograph 306 (e.g., referring to FIG. 3). Likewise, an example of linearity of an instrument is the linearity of a calibration curve being rendered by information handling system 146 during calibration of gas chromatograph 306. Linearity and non-linearity of a calibration curve may be determined in various ways including, for example, visual inspection, analytical approaches, statistical tests (e.g., Runs Test, linear ratios, residual analysis, goodness-of-fit tests, etc.), derivatives, combinations thereof, or the like. If, for example, the derivative of a calibration curve being rendered is constant or approximately constant, it is determined to be linear. Determination of linearity and non-linearity using derivatives may involve a comparison between a calculated derivative and a threshold maximum value, where derivative values exceeding the maximum value amounts to a determination of non-linearity, and derivative values below the maximum value amounts to a determination of linearity. Linearity and non-linearity of a calibration curve may be determined in real-time by information handling system 146.

Target measurement density on a calibration curve may be operator-specified. An operator may pre-select, using for example a user interface (e.g., input device 150, referring to FIG. 1), a calibration measurement density, and the dilution rate be adjusted accordingly by information handling system 146 to meet the target density. In other examples, measurement density is selected and/or changed by an operator during calibration. A target density may be, for example, between 5 and 60 measurements per 0.1 mol fraction of one or more analytes. Alternatively, from about 5 to about 20, about 20 to about 30, about 30 to about 40, about 40 to about 60, or any ranges therebetween. Alternatively, the same number of measurements within a 1 decade to about 10 decades, or any ranges therebetween. As used herein, a "decade" of concentration is a ten-fold difference in concentration compared to an initial value. For example, a 10 decade range for an initial analyte concentration of 90 mol % would be between 9 mol % and 90 mol %. Likewise, a 1 decade range for an initial analyte concentration of 1 mol % would be between 1 mol % and 10 mol % or between 0.1 mol % and 1 mol %.

With continued reference to "dynamic modification" examples, another example of an engineering factor which may be used to dynamically influence the dilution rate may comprise variance between extrapolated values and expected measurements of the gas chromatograph. For example, real-time extrapolated ("look-ahead") values, such as a linear, $n^{th}$-ordered polynomial, trigonometric, logarithmic, or other mathematically extrapolated values of measurements being recorded in real-time may be compared to an expected value. Stated simply, a real-time determination by information handling system 146 that the measurements are failing to fully account for the curvilinearity of a region of the calibration curve may trigger a change (e.g., increase) in the dilution rate. For example, upon detecting an insufficiency in the curvilinearity of a particular region of the calibration curve being rendered, information handling system 146 may decrease the dilution rate to increase the number of measurements for a given concentration range, thus enhancing quality and resolution of the calibration curve in that range. Similarly, if interpolated values between measurements indicate a failure of the calibration curve to appropriately represent curvilinearity, a change in the dilution rate may be likewise triggered. In one or more examples, the principles of process control, e.g., proportional-integral-derivative (PID) or other controllers, may be incorporated into the dynamic modification. This may ensure even rendering of the curves.

In block 612, based on the measurements at the various analyte concentrations with the gas chromatograph, a complete calibration curve is constructed for a given range and one or more gas chromatographs are calibrated based on the complete calibration curve. The complete calibration curve may establish relationships between one or more analyte concentrations and response signal and may in some examples be used as a reference to estimate the concentrations of the one or more analytes in unknown samples.

Figure 7:
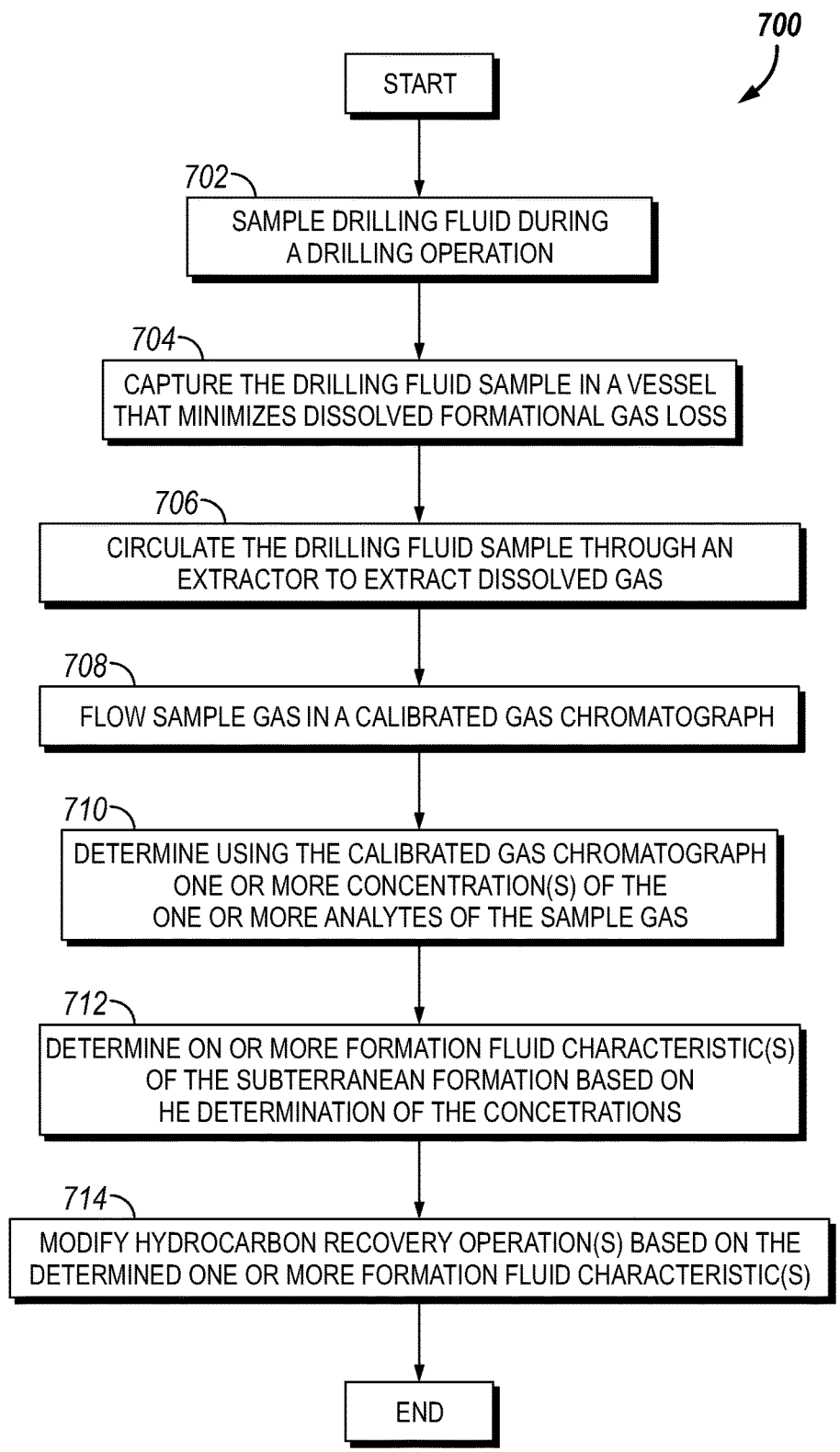
FIG. 7 illustrates a workflow depicting operations for using a calibrated gas chromatograph during a drilling operation, in accordance with one or more examples of the present disclosure.

As alluded to previously, gas extraction and chromatography system 300 (e.g., referring to FIG. 3) may be used to perform one or more blocks of workflow 600 at drilling system 100 (e.g., referring to FIG. 1) or an offsite location. One or more calibrated gas chromatographs may be incorporated into and/or used alongside drilling system 100. Accordingly, FIG. 7 illustrates how a calibrated gas chromatograph may be used in such an environment. It should be understood that, while workflow 700 is discussed with reference to drilling systems, the calibrated gas chromatograph of the present disclosure should not be limited only to drilling systems.

FIG. 7 is a workflow 700 for using a calibrated gas chromatograph during a drilling operation, in accordance with one or more examples of the present disclosure. As with FIG. 6, operations of FIG. 7 may be controlled in real-time with information handling system 146.

At block 702, recirculated drilling fluid of a borehole extending into a subterranean formation during a drilling operation is sampled. The drilling fluid sample comprises one or more analytes. A drilling operation may proceed in the manner previously described for drilling system 100 (e.g., referring to FIG. 1). Block 702 may alternatively comprise any suitable oil and gas operation at a well site such as, for example, logging, well testing, completion, casing and cementing, hydraulic fracturing, production, well stimulation, or any other operation where it is desired to estimate formation fluid properties.

At block 704, the drilling fluid sample is optionally captured in a vessel that minimizes dissolved formational gas loss. The arrangement of FIG. 3A which shows extracted gas being recirculated between a vessel 304 and gas extraction system 302 may allow larger sample sizes as well as reduced formational gas loss. In alternative examples, gas may bypass vessel 304 and proceed directly towards gas chromatograph 306. It should be understood that while not shown, one or more pumps, circulators, flow control devices, etc., or any suitable device for facilitating proper functioning of gas extraction and chromatography system 300 may be included to carry out the operations of block 704.

At block 706, the drilling fluid sample is circulated through a gas extractor to extract dissolved gas. Extraction of the dissolved gas may involve the use of one or more fans, pumps, permeable medium, gas detectors/monitors, bags, canisters, scrubbers, filters, vacuum pumps, probes, samplers (e.g., autosamplers), combinations thereof, or the like. The extracted gas comprises the one or more analytes and is predominantly made up of chemical components in the vapor phase.

At block 708, sample gas is input into a calibrated gas chromatograph. The sample gas is the gas input into the chromatographic column(s) and may comprise the extracted gas or component(s) thereof as well as, diluent and/or carrier gas, depending on the particular configuration of gas extraction and chromatography system 300 (e.g., referring to FIGS. 3A-3G). The calibrated gas chromatograph generally comprises one or more columns, one or more detectors, and a stationary phase. In operation, a mobile phase, i.e., carrier gas, carries the one or more analytes through the stationary phase of the gas chromatograph. The one or more analytes are at least partially separated (e.g., from each other, non-analyte(s), and/or inert compounds) as they pass through the one or more columns, and the at least partially separated analytes are then analyzed using one or more detectors of the gas chromatograph. One or more temperature controllers may regulate the temperature of the gas as it flows through the gas chromatograph. Other devices may, in some examples, be included within a calibrated gas chromatograph, such as one or more pressure controllers to control the pressure (e.g., at either side of the one or more chromatographic columns), one or more pressure/flow gauges (e.g., for monitoring flow), one or more column ovens/heaters, a data system and/or software (e.g., for acquiring and/or storing response signals of the one or more detectors and transmitting them to information handling system 146), a waste collector for disposing of analyzed gas, combinations thereof, and the like.

The calibrated gas chromatograph may be calibrated according to one or more blocks of workflow 600 (e.g., referring to FIG. 6), and may be operable to determine concentrations of analytes based at least in part on one or more complete calibration curves. Where the one or more complete calibration curves comprise a plurality, at least one, some, or all may be derived from calibration according to the present disclosure (e.g., workflow 600).

At block 710, the calibrated gas chromatograph is used to determine one or more concentrations of the one or more analytes of the sample gas. Determining concentrations in block 710 may comprise rendering a response signal versus time curve (e.g., chromatogram). In examples where a response signal is measured with respect to time, area under the curve may be used to calculate the concentration of one or more analytes. Determining concentrations of the one or more analytes may also involve the use of extrapolation and/or interpolation of the one or more calibration curves. In addition, or alternatively, determining concentrations may involve the use of, for example, simple linear regression, multiple linear regression, polynomial regression, ridge regression (L2 regularization), lasso regression (L1 regularization), elastic net regression, Poisson regression, quantile regression, generalized additive models (GAM).

At block 712, one or more formation fluid characteristics of the subterranean formation are determined based on the determined concentrations of the gas. For example, with reference to FIG. 3A, information handling system 146 can determine a formation characteristic based on the determined values of concentration of one or more analytes of the sample gas. Determining the formation characteristic using the determined chemical composition may comprise comparing the determined chemical composition to known chemical compositions of subterranean formations. The formation characteristics may comprise at least one of a type of rock in the subterranean formation, the presence of hydrocarbons in the subterranean formation, the production potential for a stratum of the subterranean formation, and the movement of fluid within the strata. Determination of one or more concentrations of the one or more analytes of the sample gas may yield analyte concentration and response signal data which may be used to estimate one or more properties, analyte concentrations, or other material factor associated with reservoir fluid. Non-limiting examples of formation fluid properties which may be estimated by the determination of analyte(s) in block 710 may include chemical composition, gas-to-oil ratio (GOR), molecular weight, density, formation volume factor (FVF), specific gravity, heating value (i.e., calorific value), viscosity, Wobbe index, combinations thereof, and the like.

Estimating of concentrations of analyte(s) in a formation fluid or other properties may be performed in any suitable manner including, without limitation, linear regression methods, curve-fitting, extrapolation, interpolation, Newton's method, and the like, as well as non-graphical methods such as with "black box" methods including, for example, machine learning and/or artificially intelligent algorithms. Exemplary machine learning and/or artificially intelligent algorithms to be used in in a black box model may include, without limitation, a supervised, semi-supervised, unsupervised, and/or reinforced model, a binary classification model, a multiclass classification model, a regression models, decision trees, a random forest classifier, logistic regression, support vector machine algorithms (SVM), a Naive Bayes classifier, k-nearest neighbors (K-NN) algorithms, clustering, k-means clustering, a dimensionality reduction algorithm, a gradient boosting algorithm, a probabilistic classifier, the like, and any combination thereof.

At block 714, hydrocarbon recovery operation(s) is modified based on the determined formation fluid characteristic(s). For example, a drilling operation could be modified (e.g., direction, rate, pills, etc.).

Thus, in contrast to conventional approaches, the present disclosure may provide improved methods and systems for calibrating gas chromatographs. Gas chromatography calibration curves produced by these methods and systems may be both more accurate as well as encompassing larger concentration ranges (e.g., multiple decades) and may better account for relationships between concentration and response signals. Curvature of these calibration curves may be more precise due to increased measurement density at regions of interest. As mentioned, matching the dilution rate to the instrument cycle time may, in some examples, result in increased calibration efficiency, reduced time-loss, and high throughput of rendered calibration curves while still maintaining high resolution and quality of the curves.

Accordingly, the present disclosure may provide methods for calibrating gas chromatographs as well as performing well site operations using improved chromatography. The methods and systems may include any of the various features disclosed herein, including one or more of the following statements.

Statement 1: A method comprising: extracting one or more dissolved gases from one or more fluid samples to form one or more extracted gases; configuring a dilution rate with an information handling system; automatically diluting the one or more extracted gases with diluent at the dilution rate to form one or more diluted extracted gases; adding the one or more diluted extracted gases to a carrier gas to form sample gas; separating one or more components of the sample gas with one or more gas chromatographs; measuring one or more analytes of the sample gas with one or more detectors; and calibrating the one or more gas chromatographs based at least in part on the measuring of the one or more analytes.

Statement 2: The method of statement 1, wherein configuring the dilution rate is based at least in part on an instrument cycle time of at least one of the one or more gas chromatographs.

Statement 3: The method of statements 1 or 2, wherein configuring the dilution rate is based at least in part on a linearity or non-linearity of a calibration curve being rendered by the information handling system.

Statement 4: The method of any of statements 1-3, wherein configuring the dilution rate with the information handling system is based on one or more user interactions with a user interface, wherein the one or more user interactions indicate at least a target measurement density.

Statement 5: The method of any of statements 1-4, further comprising modifying in real-time the dilution rate with the information handling system.

Statement 6: The method of statement 5, wherein the modifying is based at least in part on a comparison between a measured and a target measurement density.

Statement 7: The method of any of statements 1-6, wherein automatically diluting the one or more extracted gases comprises increasing or decreasing concentration of one or more analytes of the one or more extracted gases to form the one or more diluted extracted gases.

Statement 8: The method of any of statements 1-7, wherein the diluent comprises N2 and pentane.

Statement 9: The method of any of statements 1-8, wherein the automatic diluting of the one or more extracted gases at dilution rate comprises flowing diluent from a diluent source at a flow rate set by a flow control device, wherein the flow control device is communicatively coupled to the information handling system.

Statement 10: The method of any of statements 1-9, further comprising sampling a drilling fluid during a drilling operation.

Statement 11: A method comprising: extracting one or more dissolved gases from one or more fluid samples to form one or more extracted gases; configuring dilution rate with an information handling system; adding the one or more extracted gases to a carrier gas to form one or more mixtures comprising the one or more extracted gases and the carrier gas; automatically diluting the one or more mixtures with diluent at the dilution rate to form sample gas; separating one or more components of the sample gas with a gas chromatograph; measuring one or more analytes of the sample gas with one or more detectors of the gas chromatograph; and calibrating the one or more gas chromatographs based at least in part on the measuring of the one or more analytes.

Statement 12: The method of statement 11, wherein calibrating the one or more gas chromatographs comprises rendering one or more calibration curves across a range of at least two decades of concentration of at least one of the one or more analytes.

Statement 13: A system comprising: a fluid sample sources comprising one or more fluid samples; a gas extractor operable to extract one or more gases from the one or more fluid samples; a gas chromatograph, wherein the gas chromatograph is in fluidic communication with the gas extractor, a carrier gas source, and a diluent source, and communicatively coupled to an information handling system; and one or more flow controllers operable to adjust flow of diluent at a dilution rate, wherein the information handling system is communicatively coupled to the one or more flow controllers and operable to configure the dilution rate.

Statement 14: The system of statement 13, wherein configuring the dilution rate is performed in real-time by the information handling system.

Statement 15: The system of statement 14, wherein configuring the dilution rate is based at least in part on a comparison between a target measurement density and an actual measurement density.

Statement 16: The system of any of statements 13-15, wherein the configuring the dilution rate is based on an instrument cycle time of at least the gas chromatograph.

Statement 17: The system of any of statements 16 or 13-15, further comprising a user interface, wherein the configuring of the dilution rate is based at least in part on a user interaction with the user interface.

Statement 18: The system of any of statements 13-17, wherein the flow of diluent decreases concentration of at least one analyte of interest of the one or more gases.

Statement 19: The system of any of statements 13-18, wherein the flow of diluent increases concentration of at least one analyte of interest of the one or more gases.

Statement 20: The system of any of statements 13-19, wherein the flow of diluent varies concentration of at least one analyte of interest across a range of at least two decades.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, as the present examples may be modified and practiced in different but equivalent manners apparent to those skilled in the art having the benefit of the teachings herein. Although individual examples are discussed, all combinations of one or more examples are contemplated and covered by the disclosure. Furthermore, no limitations are intended to the details of construction or design shown herein, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure.

What is claimed is:

1. A method comprising:
    extracting one or more dissolved gases from one or more fluid samples to form one or more extracted gases;
    configuring a dilution rate with an information handling system, wherein configuring the dilution rate is based at least in part on an instrument cycle time of at least one of the one or more gas chromatographs;
    automatically diluting the one or more extracted gases with diluent at the dilution rate to form one or more diluted extracted gases;
    adding the one or more diluted extracted gases to a carrier gas to form sample gas;
    separating one or more components of the sample gas with one or more gas chromatographs;
    measuring one or more analytes of the sample gas with one or more detectors; and
    calibrating the one or more gas chromatographs based at least in part on the measuring of the one or more analytes.

2. The method of claim 1, further comprising modifying in real-time the dilution rate with the information handling system.

3. The method of claim 2, wherein the modifying is based at least in part on a comparison between a measured and a target measurement density.

4. The method of claim 1, wherein automatically diluting the one or more extracted gases comprises increasing or decreasing concentration of one or more analytes of the one or more extracted gases to form the one or more diluted extracted gases.

5. The method of claim 1, wherein the diluent comprises N2 and pentane.

6. The method of claim 1, wherein the automatic diluting of the one or more extracted gases at dilution rate comprises flowing diluent from a diluent source at a flow rate set by a flow control device, wherein the flow control device is communicatively coupled to the information handling system.

7. The method of claim 1, further comprising sampling a drilling fluid during a drilling operation.

8. The method of claim 1, wherein calibrating the one or more gas chromatographs comprises rendering one or more calibration curves across a range of at least two decades of concentration of at least one of the one or more analytes.

9. A system comprising:
    a fluid sample source comprising one or more fluid samples;
    a gas extractor operable to extract one or more gases from the one or more fluid samples;
    a gas chromatograph, wherein the gas chromatograph is in fluidic communication with the gas extractor, a carrier gas source, and a diluent source, and communicatively coupled to an information handling system; and
    one or more flow controllers operable to adjust flow of diluent at a dilution rate, wherein the information handling system is communicatively coupled to the one or more flow controllers and operable to configure the dilution rate, wherein configuring the dilution rate is performed in real-time by the information handling system, and wherein configuring the dilution rate is based at least in part on a comparison between a target measurement density and an actual measurement density.

10. The system of claim 9, further comprising a user interface, wherein the configuring of the dilution rate is based at least in part on a user interaction with the user interface.

11. The system of claim 9, wherein the flow of diluent decreases concentration of at least one analyte of interest of the one or more gases.

12. The system of claim 9, wherein the flow of diluent increases concentration of at least one analyte of interest of the one or more gases.

13. The system of claim 9, wherein the flow of diluent varies concentration of at least one analyte of interest across a range of at least two decades.

14. The system of claim 9, wherein the one or more flow controllers comprise one or more mass flow controllers.

15. A method comprising:
    extracting one or more dissolved gases from one or more fluid samples to form one or more extracted gases;
    configuring a dilution rate with an information handling system, wherein configuring the dilution rate is based at least in part on a linearity or non-linearity of a calibration curve being rendered by the information handling system;
    automatically diluting the one or more extracted gases with diluent at the dilution rate to form one or more diluted extracted gases;
    adding the one or more diluted extracted gases to a carrier gas to form sample gas;
    separating one or more components of the sample gas with one or more gas chromatographs;
    measuring one or more analytes of the sample gas with one or more detectors; and
    calibrating the one or more gas chromatographs based at least in part on the measuring of the one or more analytes.

16. The method of claim 15, further comprising modifying in real-time the dilution rate with the information handling system based at least in part on the linearity or non-linearity of the calibration curve being rendered.

17. A method comprising:
    extracting one or more dissolved gases from one or more fluid samples to form one or more extracted gases;
    configuring a dilution rate with an information handling system, wherein configuring the dilution rate with the information handling system is based on one or more user interactions with a user interface, wherein the one or more user interactions indicate at least a target measurement density;
    automatically diluting the one or more extracted gases with diluent at the dilution rate to form one or more diluted extracted gases;
    adding the one or more diluted extracted gases to a carrier gas to form sample gas;
    separating one or more components of the sample gas with one or more gas chromatographs;

measuring one or more analytes of the sample gas with one or more detectors; and calibrating the one or more gas chromatographs based at least in part on the measuring of the one or more analytes.

18. The method of claim 17, further comprising: capturing the one or more fluid samples in a vessel that minimizes dissolved formational gas loss prior to extracting the one or more dissolved gases; and recirculating the one or more fluid samples between the vessel and a gas extractor to extract the one or more dissolved gases.

19. A system comprising:
a fluid sample source comprising one or more fluid samples;
a gas extractor operable to extract one or more gases from the one or more fluid samples;
a gas chromatograph, wherein the gas chromatograph is in fluidic communication with the gas extractor, a carrier gas source, and a diluent source, and communicatively coupled to an information handling system; and
one or more flow controllers operable to adjust flow of diluent at a dilution rate, wherein the information handling system is communicatively coupled to the one or more flow controllers and operable to configure the dilution rate, wherein configuring the dilution rate is performed in real-time by the information handling system, and wherein the configuring the dilution rate is based on an instrument cycle time of at least the gas chromatograph.

20. The system of claim 19, further comprising a sample-temperature controller in fluid communication with the fluid sample source and the gas extractor, the sample-temperature controller being configured to alter or maintain a temperature of the one or more fluid samples.

* * * * *